United States Patent
Park

[11] Patent Number: 5,910,158
[45] Date of Patent: Jun. 8, 1999

[54] FUZZY CONTROL APPARATUS AND METHOD OF BRANCHED REFRIGERANT FLOW AND FUEL COMBUSTION IN MULTI ABSORPTION TYPE HEAT PUMP

[75] Inventor: Joon-Hyung Park, Seoul, Rep. of Korea

[73] Assignee: LG Electronics Inc., Seoul, Rep. of Korea

[21] Appl. No.: 08/950,972

[22] Filed: Oct. 15, 1997

[30] Foreign Application Priority Data

Oct. 15, 1996 [KR] Rep. of Korea ............... 96-45991

[51] Int. Cl.$^6$ ............................ F25B 30/04
[52] U.S. Cl. ............... 62/148; 62/138; 62/158; 62/168; 62/476; 62/483; 62/208
[58] Field of Search ............. 62/148, 138, 158, 62/168, 476, 483

[56] References Cited

U.S. PATENT DOCUMENTS

| | | |
|---|---|---|
| 4,505,123 | 3/1985 | Kusakabe et al. .............. 62/148 |
| 4,596,122 | 6/1986 | Kantner ........................ 62/141 |
| 5,138,846 | 8/1992 | Ogawa et al. ................. 62/148 |
| 5,557,939 | 9/1996 | Mizukami et al. ............ 62/148 |
| 5,682,755 | 11/1997 | Uchida et al. ............... 62/148 |

*Primary Examiner*—Henry Bennett
*Assistant Examiner*—Mark Shulman
*Attorney, Agent, or Firm*—Finnegan, Henderson, Farabow, Garrett & Dunner, L.L.P.

[57] ABSTRACT

A fuzzy control apparatus and method for a branched refrigerant flow and fuel combustion in a multi absorption type-heat pump is disclosed. The heat pump is controlled by automatically determining the operation state of an outdoor unit in relation to indoor loads.

5 Claims, 3 Drawing Sheets

FUZZY CONTROL APPARATUS AND METHOD OF BRANCHED REFRIGERANT FLOW AND FUEL COMBUSTION IN MULTI ABSORPTION TYPE HEAT PUMP

BACKGROUND OF THE INVENTION

1. Field of the Invention

The present invention generally relates to a fuzzy logic control apparatus and a method of controlling branched refrigerant flow and fuel combustion in a multi-absorption type heat pump using fuzzy logic.

2. Description of the Related Art

FIG. 1 is a schematic diagram of a conventional multi-absorption type heat pump. It includes a regenerator 2, where an ammonia vapor refrigerant is obtained from a highly concentrated operating solution (ammonia aqua solution) by vaporizing the operating solution using heat generated from combustion section 1 and from a low concentrated ammonia aqua solution (hereinbelow referred to as weak solution) created by the evaporation of partial ammonia. A compressor 3 compresses liquid refrigerant using water chilled by heat-exchanging the vapor refrigerant obtained in the regenerator 2 with outdoor air and evaporator 4 transforms the liquid refrigerant into vapor refrigerant by vaporizing the liquid refrigerant from the compressor 3 using water from the indoor unit. First and second control valves 5 and 6 control the amount of heat-exchanged cooling water introduced from the evaporator 4 into first and second indoor units 7 and 8 respectively. Finally, absorber 9 transforms the vapor refrigerant created in the evaporator 4 into a highly concentrated strong solution by continuing the absorption operation, thus absorbing the weak solution, and solution pump 10 transfers the strong solution made in the absorber 9 to the regenerator 2.

The operation of the conventional heat pump shown in FIG. 1 will now be described.

Ammonia aqua solution, having a lower vaporizing temperature than water, exists in regenerator 2. Therefore, when regenerator 2 is heated by combustion section 1, ammonia aqua solution is separated from the water by evaporation. The remaining non-vaporized ammonia remains mixed with the non-vaporized water in a dilute solution state. In contrast, the state in which the water is not separated from the ammonia aqua solution is referred to as strong solution state.

The separated pure ammonia, referred to as the refrigerant, exchanges heat in the compressor 3 and the evaporator 4 with cooling water. Thus, heat-exchanged cooling water in the evaporator 4 is introduced into the indoor units 7 and 8 by the operation of the first and second control valves 5 and 6, thereby performing a cooling operation. After the cooling operation, cooling water of an increased temperature is returned to the evaporator 4.

Conventionally, the refrigerant flow is introduced into respective indoor units 7 and 8, and is controlled by a user's manual manipulation of the first and second control valves 5 and 6. Further, the refrigerant vaporized in the evaporator 4 is transformed to a high concentrated strong solution in the absorber 9 by the consecutive absorption operation for absorbing the weak solution. The high concentration strong solution is transferred into the high pressured regenerator 2 by a pumping operation of the solution pump 10.

The above described operation represents one cycle that is periodically repeated.

A conventional multi-absorption type heat pump, however, has a shortcoming in that it does not adequately handle temperature variations in an indoor environment. This is because the conventional heat pump is operated according to one fixed cycle by an on/off control method. In addition, it is difficult to operate multiple indoor units at different temperature settings. Moreover, a second shortcoming of a conventional system is that a user must manually change the refrigerant flow supplied into the respective indoor units so as to obtain a desired temperature condition.

SUMMARY OF THE INVENTION

It is an object of this invention to overcome the aforementioned problems and disadvantages of the prior art system.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

According to one aspect of the present invention, a fuzzy control apparatus for controlling refrigerant flow and fuel combustion in a multi absorption type heat pump, as broadly defined and embodied herein, comprises an indoor temperature detecting section for detecting a temperature of an indoor unit; an indoor unit microcomputer for receiving a detected temperatures from the indoor temperature detecting section and for receiving a temperature designated by a user; and an outdoor unit microcomputer for controlling a burner and a fuel flow control valve based on the detected temperature and the temperature designated by the user.

According to another aspect of the present invention, a fuzzy control method of controlling refrigerant flow and fuel combustion in a multi absorption type heat pump, as embodied herein, comprises computing an error value between a designated temperature and an indoor temperature; converting the error value to a fuzzy error value; fuzzy-reasoning on the fuzzy error value; and converting a result obtained in the fuzzy-reasoning step to a non-fuzzy value suitable to control energy input to a burner and an opening and closing of a refrigerant flow control valve.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

Further objects and advantages of the present invention will be apparent from the following description, with reference to the accompanying drawings wherein a preferred embodiment of the present invention is clearly shown.

In the drawings.

DETAILED DESCRIPTION OF THE INVENTION

Reference will now be made in detail to the embodiments of the invention, examples of which are illustrated in the accompanying drawings. Wherever possible, the same reference numbers will be used throughout the drawings to refer to the same or like parts.

Figure 1:
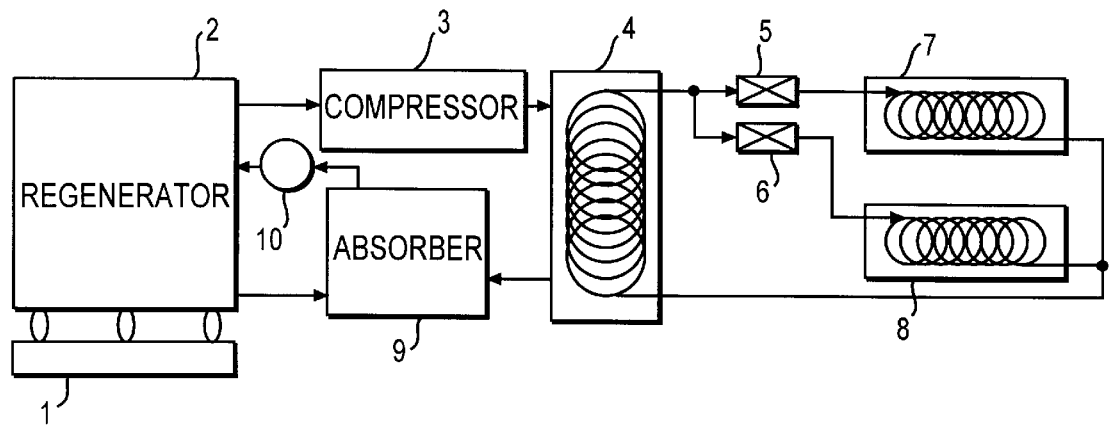
FIG. 1 is a block diagram of a conventional multi-absorption type heat pump.
Figure 2:
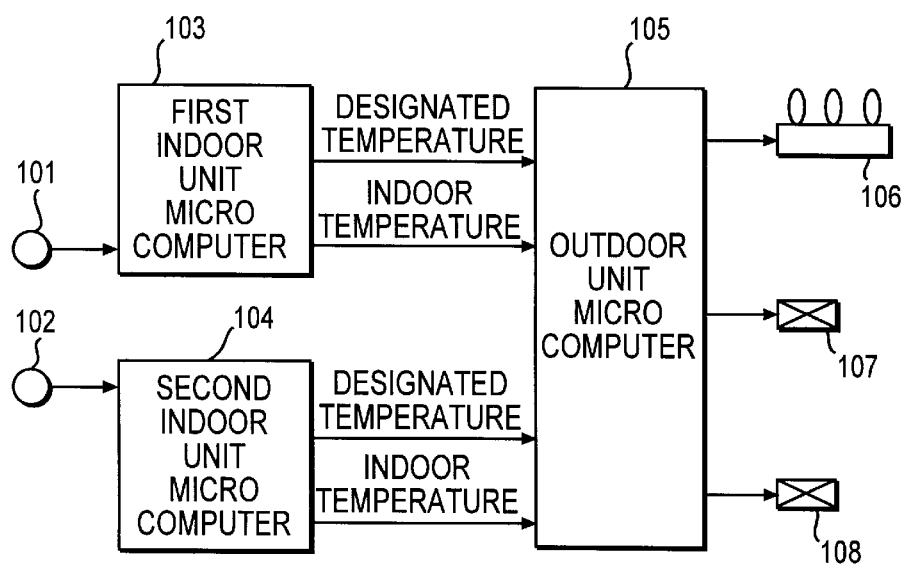
FIG. 2 is a diagram of a fuzzy control apparatus for branched refrigerant flow and fuel combustion in a multi-absorption type heat pump according to an embodiment of the present invention.

FIG. 2 is a diagram of a fuzzy control apparatus for branched refrigerant flow and fuel combustion in a multi-absorption type heat pump consistent with the present invention. First and second indoor temperature detecting parts 101 and 102 detect respective temperatures of a plurality of indoor units, and first and second indoor unit microcomputers 103 and 104 forward the temperatures detected by parts 101 and 102 and the target temperatures designated by the user, to outdoor microcomputer 105. Based on the signals received from microcomputers 103 and 104, microcomputer 105 determines the amount of energy to input to a burner that controls combustion part 106 and the amount of refrigerant that passes through flow control valves 107 and 108.

Figure 4:
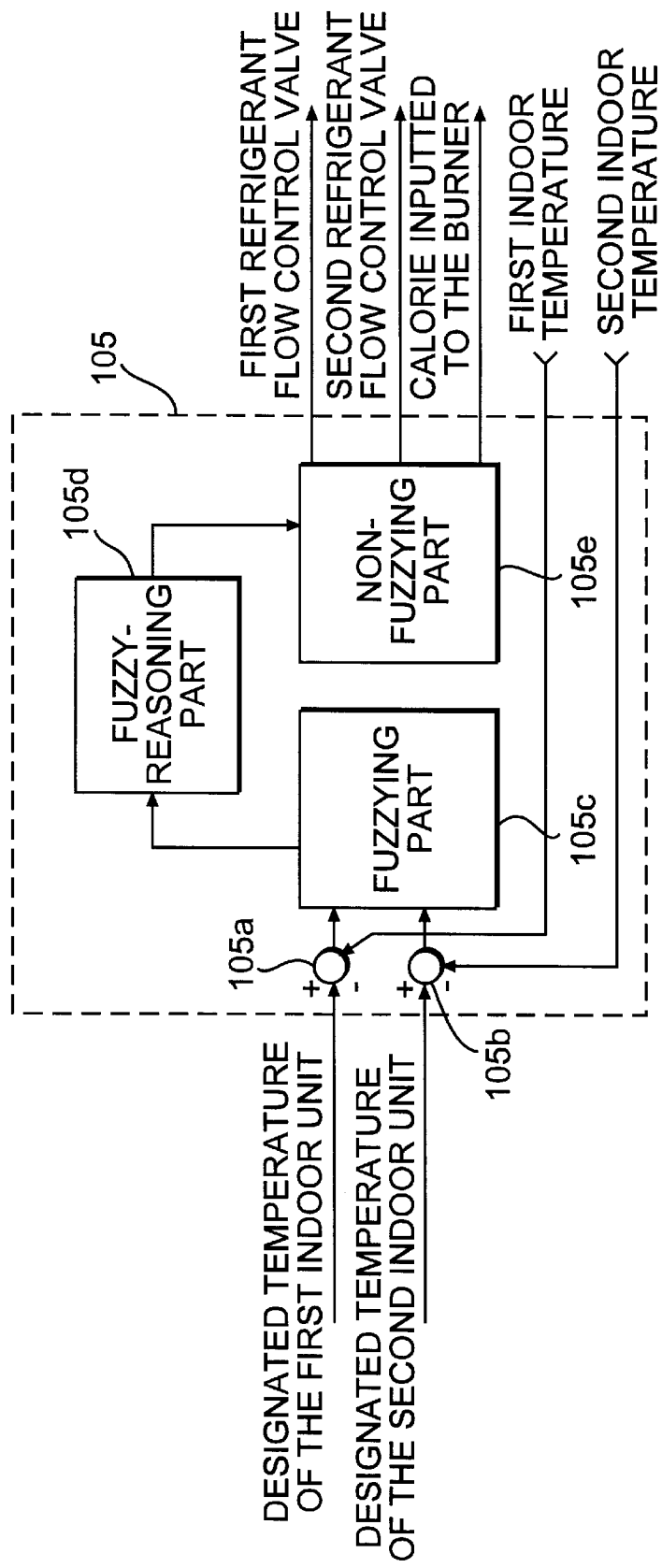
FIG. 4 is a block diagram of a microcomputer that performs fuzzy control according to the embodiment of the present invention.

As shown in more detail in FIG. 4, the outdoor unit microcomputer 105 includes a first computing unit 105*a* for determining an error value by calculating the difference between a first designated temperature obtained from the first indoor unit microcomputer 103 and an indoor temperature detected by the first indoor temperature detecting part 101, a second computing unit 105*b* similarly operates to determine an error value by calculating the difference between a second designated temperature obtained from the second indoor unit microcomputer 104 and an indoor temperature detected by the second indoor temperature detecting part 102. Further, microcomputer 105 includes a fuzzying part 105*c* for converting the error values obtained in the first and second computing units 105*a* and 105*b*, a fuzzy-obtain error values, and then output the obtained error values to the fuzzying part 105*c*. The fuzzying part 105*c* converts the values output from computing units 105*a* and 105*b* to fuzzy values and then output the fuzzied error values to the fuzzy reasoning part 105*d*. The fuzzy reasoning part 105*d* fuzzy-reasons the fuzzied error values and then outputs the fuzzy-reasoned values to non-fuzzying part 105*e*. The non-fuzzying part 105*e* converts the fuzzy values to non-fuzzy values used to control burner 106, and valves 107 and 108. In particular, output voltages are applied to the first and second refrigerant flow control valves 107 and 108. The opening and closing degree of the first and second refrigerant flow control valves 107 and 108 is controlled according to the applied voltage, thereby controlling a supply flow of the refrigerant.

In addition, the energy input to burner 106 is controlled by the outdoor unit microcomputer's 105 gas flow control through a control valve according to the fuzzy-computed result. In order to control the mixing ratio of air and fuel according to the supplied fuel amount, the outdoor unit microcomputer 105 uses a fan for the combustion, thereby controlling the air flow and the energy input to the burner.

Figure 3A:
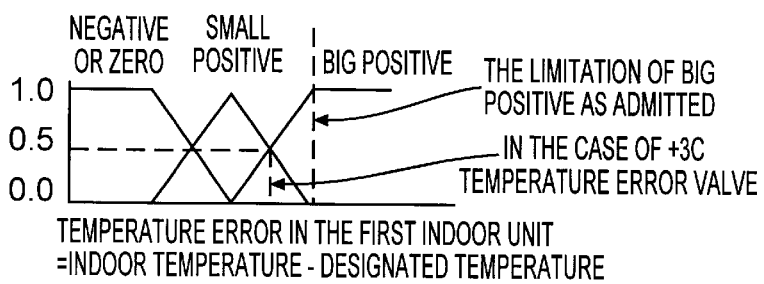
FIGS. 3A–3E are membership functions for fuzzy control according to the embodiment of the present invention.
Figure 3B:
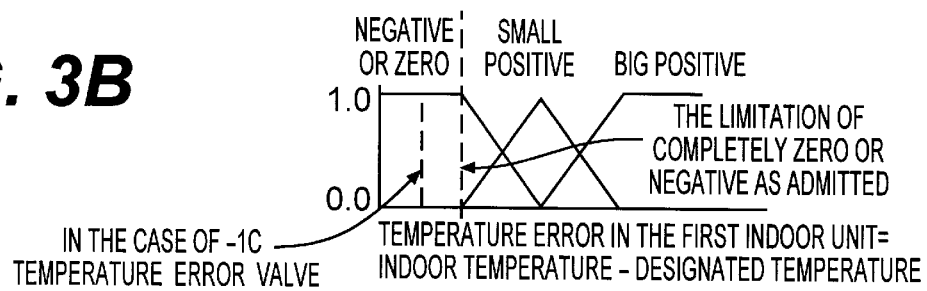
Figure 3C:
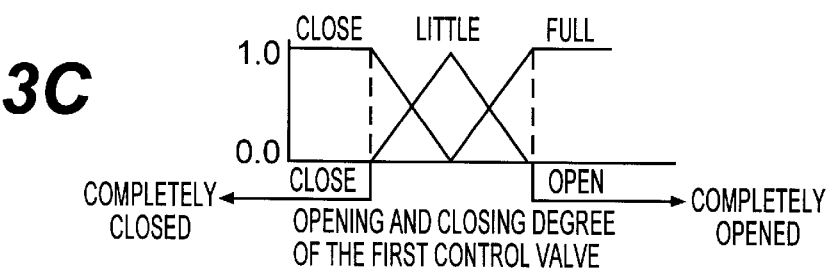

Referring to Table I, below, and FIGS. 3A–3E, when the temperature error of the first indoor unit is negative or zero, the opening and closing degree of the first refrigerant flow control valve 107 is closed, as shown in FIG. 3C.

Figure 3D:
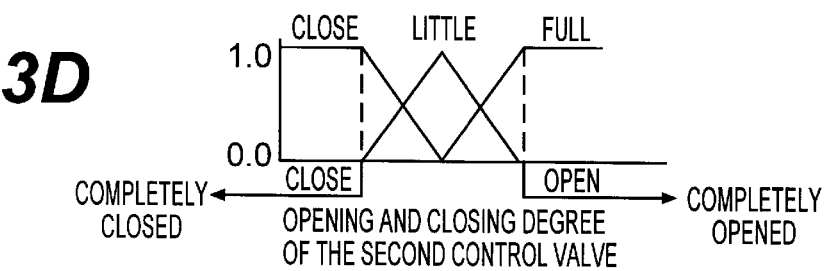
Figure 3E:
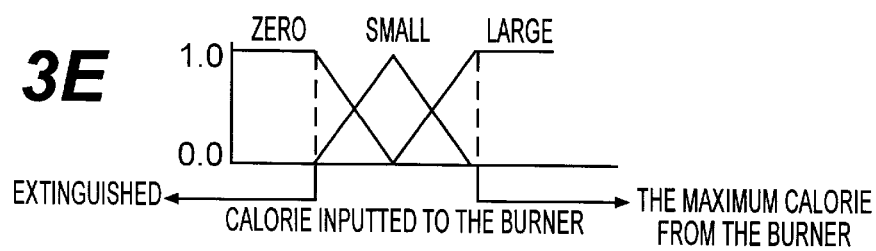

Meanwhile, when the temperature error in a second indoor unit is negative, the opening and closing degree of the second refrigerant flow control valve 108 is also closed as shown in FIG. 3D. The corresponding energy input to the burner is zero, as shown in FIG. 3E; thereby turning off a heating unit.

TABLE I

| | | | | | | | | | | |
|---|---|---|---|---|---|---|---|---|---|---|
| IF | Temperature error in the first indoor unit. | NZ | NZ | NZ | SP | SP | SP | BP | BP | BP |
| | Temperature error in the second indoor unit. | NZ | SP | BP | NZ | SP | BP | NZ | SP | BP |
| THEN | Opening and closing degree in the first control valve. | CL | CL | CL | LI | LI | LI | FU | FU | FU |
| | Opening and closing degree of the second control valve. | CL | LI | FU | CL | LI | FU | CL | LI | FU |
| | Energy input to the burner. | ZE | SM | SM | SM | SM | LA | SM | LA | LA |

Key: NZ (negative or zero); SP (small positive); BP (big positive); CL (valve closed); LI (valve little open); FU (valve largely open); ZE (zero); SM (small); LA (large).

reasoning part 105*d* for performing fuzzy-reasoning according to values output from the fuzzying part 105*c*, and non-fuzzying part 105*e* for converting the fuzzy-reasoning values obtained in the fuzzy reasoning part 105*d* to non-fuzzy values. The output of non-fuzzying part 105*e* controls the caloric input to burner 106 and the opening and closing degree of first and second refrigerant flow control valves 107 and 108.

The operation of the present invention according to the disclosed embodiment will now be described.

First and second in door temperature detecting parts 101 and 102 detect the temperatures of respective indoor units and then input the detected temperatures to the first and second indoor unit microcomputers 103 and 104. The first and second microcomputers 103 and 104 forward the detected temperatures and the user designated indoor temperatures to the outdoor unit microcomputer 105. The first and second computing units 105*a* and 105*b* subtract the detected temperatures from the designated temperatures to An additional example of the operation of the present invention will now be described. Assume that the present indoor temperature and the user designated temperature of a first room are 23 and 20 degrees Celsius, respectively; and that the present indoor temperature and the user designated temperature of a second room are 20 and 19 degrees Celsius, respectively. The error values obtained by computing units 105*a* and 105*b* will then be +3 degrees for the first room and −1 degrees for the second room. As shown in FIG. 3A, an error value of +3 means that the degree of "Big Positive" and "Small Positive" are each about 0.5. An error value of −1 means that this value is in the membership "Negative or Zero" with a degree of 1.0. Based on Table I, the following two rules are possible, and either one may be used:

Rule 1: The temperature error value of the first room is "Big Positive" (degree 0.5) and the temperature error value of the second room is "Negative or Zero" (degree 1.0), so the opening degree of the valve controlling the first room is Full Open and that of the second room is Close.

Rule 2: The temperature error value of the first room is "Small Positive" (degree 0.5) and the temperature error value of the second room is "Negative or Zero" (degree 1.0), so the opening degree of the valve controlling the first room is Little Open and that of the second room is Close.

Under either Rule 1 or Rule 2, the energy input to the burner is Small.

As described hereinbefore, the present invention makes it possible to operate a plurality of indoor units at respective independent temperature conditions. As a result, it makes it possible to control independently temperature of respective rooms where the indoor units are established. In addition, the present invention minimizes the energy consumption by detecting a room where the cooling operation is not needed and excluding the introduction of the chilled cooling water into the room. Moreover, it can establish a plurality of indoor units to one outdoor unit.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A fuzzy control apparatus for controlling refrigerant flow and fuel combustion in a multi absorption type heat pump, comprising:

an indoor temperature detecting section for detecting a temperature of an indoor unit;

a first microcomputer, electrically coupled to the indoor temperature detecting section, for receiving a detected temperature from the indoor temperature detecting section and for receiving a temperature designated by a user; and a second microcomputer, electrically coupled to the first microcomputer, for controlling a burner and a fuel flow control valve based on said detected temperature and said temperature designated by the user.

2. The fuzzy control apparatus in accordance with claim 1, wherein said second microcomputer includes means for controlling the burner and the fuel flow control valves by means of fuzzy-reasoning said detected temperature and said temperature designated by the user.

3. The fuzzy control apparatus in accordance with claim 1, wherein said second microcomputer comprises:

a computing unit for computing an error value by calculating the difference between said detected temperature and said temperature detected by the user;

a fuzzying section for converting said error value into a fuzzy value;

a fuzzy-reasoning section for performing fuzzy-reasoning on said fuzzy value to obtain a fuzzy result; and a non-fuzzying section for converting said fuzzy result to a non-fuzzy value suitable to control the burner and an extent of opening and closing of said fuel flow control valve.

4. A fuzzy control method of controlling refrigerant flow and fuel combustion in a multi absorption type heat pump, comprising:

computing an error value between a designated temperature and an indoor temperature;

converting the error value to a fuzzy error value;

performing fuzzy-reasoning on the fuzzy error value; and converting a result obtained in said fuzzy-reasoning step to a non-fuzzy value and using said non-fuzzy value to control energy input to a burner and to control opening and closing of a refrigerant flow control valve.

5. The fuzzy control method in accordance with claim 4, wherein the fuzzy-reasoning step includes performing fuzzy-reasoning on the fuzzy error value according to a rule table.

* * * * *